United States Patent [19]

Savage

[11] Patent Number: 5,202,680
[45] Date of Patent: Apr. 13, 1993

[54] SYSTEM FOR DRILL STRING TALLYING, TRACKING AND SERVICE FACTOR MEASUREMENT

[75] Inventor: George M. Savage, Grove, Okla.

[73] Assignees: Paul C. Koomey, Houston; Tom L. McDaniel, Dallas, both of Tex.

[21] Appl. No.: 795,943

[22] Filed: Nov. 18, 1991

[51] Int. Cl.[5] .............................................. G0V1 1/00
[52] U.S. Cl. .................................. 340/853.1; 175/40; 342/44
[58] Field of Search ...................... 340/853.1, 853.3; 175/40; 342/42, 44, 51

[56] References Cited

U.S. PATENT DOCUMENTS

| | | | |
|---|---|---|---|
| 4,016,967 | 12/1977 | Hall | 324/260 |
| 4,196,418 | 4/1980 | Kip et al. | 340/152 T |
| 4,202,490 | 5/1980 | Gunkel | 235/449 |
| 4,468,959 | 9/1984 | Roberts | 73/151 |
| 4,578,991 | 4/1986 | Nowlin | 73/151 |
| 4,698,631 | 10/1987 | Kelly | 340/853 |

OTHER PUBLICATIONS

IADC/SPE paper #17210, "Drillstring Identification to Reduce Drillsring Failures" by G. D. Nijen Twilhaar, Feb. 1988.
Den-Con Tool Co. Sales Brochures, 3 Sheets, Copyright 1991, 1992.

Primary Examiner—J. Woodrow Eldred

[57] ABSTRACT

A system for the automatic tallying of uniquely serialized drill string components from which well depth is determined, in hole component inventories are maintained, individual components are tracked through the well bore, component diameters are identified with respect to blowout preventer seal elevations and the determination and measurement of individual component down hole service factors with cumulative totalization in a computerized data base management system for these service factors for the purpose of better equalizing wear in order to obtain optimum life from drill strings.

14 Claims, 4 Drawing Sheets

SYSTEM FOR DRILL STRING TALLYING, TRACKING AND SERVICE FACTOR MEASUREMENT

FIELD OF THE INVENTION

This invention relates to the automatic tallying of uniquely serialized oil field tubulars as they enter or are withdrawn from well bore service and the application of these tallies to service records and down hole depth monitoring.

BACKGROUND OF THE INVENTION

In the oil industry drilling, completion or working-over of wells, drill or tubing strings are used to physically enter and enable performance of desired work functions down hole. In drilling operations drill strings are generally categorized as drill stem or drill pipe and bottom hole assemblies. Drill pipe joint lengths vary in the range of 30 feet and are connected together by "tool joints" having a "box", or female thread on the upper end, and a "pin" or male thread on the down-hole end. Tool joints are commonly an "integral" type attached to the drill pipe by a friction or flash weld. A large drilling rig for deep drilling may have drill pipe sections in excess of 500 or 600 joints. Drill pipe makes up the principal length and investment of a given drill string.

Bottom hole assemblies represent a lesser overall footage of the drill string and are thick walled approximate 30 foot long tubular sections called "drill collars." Drill collars provide weight to be run on drill bits. Drill collars have larger and more rugged box and pin connections than drill pipe and the threads of these connections are machined from the body of the drill collar itself. Bottom hole assemblies may include various "subs" of relatively short length for crossover between dissimilar thread sizes or forms as between drill pipe and drill collars. Other subs might include bit subs for adapting a bit thread to a drill collar, stabilizer subs serve to center drill collars in the well bore and safety valves A square or hexagonal cross section "kelly" passing through a roller kelly drive bushing seated in the rotary table serves to impart rotation to the drill string in the hole. A kelly saver sub is customarily screwed onto the lower end of the kelly and provides a wear thread for the repeated make and break of the kelly when adding drill pipe when drilling. Many offshore rigs now use a "top drive" in lieu of the rotary table and kelly while drilling and drill down an entire "stand" of three joints of drill pipe before a new connection is required.

The hole depths at which the bit is drilling or other types of down hole work is being conducted is presently determined by measurements taken by rig crewmen with a steel tape and are hand written and totaled by the driller in his tally book. In the case of drilling, these tallies are usually broken down by bottom hole assemblies, drill pipe and the amount of footage the kelly is in the hole using as a reference point, or datum, the top of the kelly drive bushing or top of the rotary table as zero elevation. The total of these three general categorizations therefore provides hole depth.

During normal drilling procedures, individual drill pipe joints, subs or drill collars are measured immediately prior to picking up for insertion in the well bore string. Similarly, joints are measured when laid down as to be later picked up or to be replaced by other drill string components. Over only short periods of time, errors invariably occur which are usually the cause of inadvertently omitting entries into the tally, arithmetic errors or incorrect measurements made or reported by crewmen. To check measured depth tallies, the common practice is to measure and tally each three joint stand stood back in the derrick when tripping out of the hole to replace a bit or other down hole tool. This tally of approximate 90 foot stands, including bottom hole assembly stands, is used as a check of depths and serves to check and correct faulted tallies.

Due to tally errors being common, it is normal good practice to maintain a count of total joints of drill pipe on a rig when drilling starts and when drilling has progressed, occasionally reconciling a count of tallied joints in the hole and joints on the pipe rack with the original inventory. Hole depth is critical for geological reference and for operations such as when casing a hole in order to establish the amount of casing required to be landed at the correct depth. For these reasons, accurate pipe tallies of both joint quantities and total lengths are important and much expensive rig time is spent checking and rechecking such tallies.

Drill stem retirement from service is frequently necessitated by wear on the outside diameters of pipe, tool joints and drill collars which reduces wall area and both tensile and torsional load capacity; excessive corrosion or erosion; and physical damage from poor handling practice. Also of concern is the potential development of cracks or complete failure due to stress and fatigue especially in corroded, worn and thinner walled pipe.

Drill pipe life has traditionally been evaluated in terms of total feet of hole drilled by the composite several hundred joints that make up a given string of pipe. Service life of bottom hole assembly components is usually limited by outside diameter wear or from the repeated re-machining connection threads to eventually cause too short an overall length for handling by the derrick man in the derrick. Therefore drill collar or bottom hole assembly service factor measurements, such as cumulative footage drilled or fatigue damage, may not be generally as important as for drill pipe.

Although an identification serial number may be stenciled on each joint in a non-wear area, it is virtually impossible for field crews to keep track of individual joint usage whereby the total footage each joint drills may be manually recorded and accumulated. For this reason down hole service and wear is not evenly distributed to each individual joint of an entire drill string and some joints invariably receive much greater service than others. Equalizing service presents even more difficult problems if a portion of a drill string is lost in the hole and new pipe is added and indistinguishably mixed into an existing string.

Disproportionate down hole service may often be recognized by outside diameter wear but all too frequently, particularly in deviated holes, fatigue damage may become a deciding factor in the decision to retire drill pipe. Present day drill pipe inspection methods are capable of measuring wall wear or the extent of internal pitting but can only detect fatigue in the form of cracks already initiated in service. When a few cracks begin to appear in successive routine inspections, it is currently necessary to assume every joint in the string has been subjected to identical fatigue damage and the entire string requires retirement from service.

SUMMARY OF THE INVENTION

This invention provides a means of automatically tallying and maintaining a inventory of oil rig drill stem components within the well bore. Uniquely serialized electronic identification, or transponder, tags contained by individual drill string components are recognized by an antenna and reader system as they pass through the rig floor. The uniquely serialized identification code accesses a computer data base to recall individual component information. Footage lengths of recalled in-hole components are maintained in a tally to provide a location of the components within the hole and a summation of total lengths is applied for hole depth and drill tool or bit depth determinations.

Down hole service factors indicative of component wear and useful life are also measured and computed for cumulative recording to the individually serialized components tallied in the well bore. These individual drill string component service factors include footage of hole drilled by each identified drill string component rather than the total hole drilled by the entire composite string during its useful life. Another service factor hitherto not practical to record during the useful life of each individual drill string component is the cumulative total rotations experienced during drilling or reaming. An estimate of fatigue wear, or damage, experienced by drill pipe joints rotating through abrupt hole curvatures, or "dog legs", may also be automatically computed. Fractions or percentages of fatigue life expended due to fatigue damage may be accumulated for each identified component. An additional feature of the invention is the tracking of individual components through floating drill rig sub-sea blowout preventer stacks so as to avoid attempting to seal off abnormal pressures by closing the preventers around odd size component diameters.

This invention enables grading components according to various service factors including footage of hole drilled, rotations and fatigue damage. Selection of components for down hole service may then be made to remove excessively worn joints or to better distribute equivalent service to each joint in a drill string. Equalization of service factors amongst each joint of a drill string will result in lengthened composite string life. Intervals for routine and expensive component inspections may also be extended with improved service factor equalization.

Identification is accomplished by means of uniquely coded radio frequency (RF) frequency electronic identification tags individually and protectively affixed to each component. Drill mud and earth formation material accumulations are very poor conductors of RF electromagnetic signals and severely restrict read distances between tag and the reader antenna. Electronic tags have been used to a limited extent in oil rig equipment identification including drill stem. However, their use has been hampered by short read distances further limited by contaminants encountered on the rig or in the well bore.

A preferred embodiment of my invention provides a means of tag mounting in drill string components in which tags are encapsulated in an electromagnetically conductive plastic type material. The plastic type material essentially fills the tag mounting recess in the component and provides an external surface flush with the outer surface of the mounting recess therby eliminating depressions or cavities which collect deposits of mud or formation materials. As the outside diameter of the component contacts the well bore walls while moving in the hole, the component is continually wiped of deposits which cause tag communication signal attenuation. As the component outside diameter wears in the hole, sacrificial material of the tag encapsulation will wear at a similar rate and maintain the smooth outside diameter. This feature of the invention significantly improves read distance between tag and reader as compared to a tag mounting in a recess which allows mud and formation deposition.

Electronic identification tag manufacturers have developed tag, antenna and reader systems operating on RF frequencies approved by the FCC for industrial, scientific and medical (ISM) applications. Destron-IDI of 2542 Central Avenue, Boulder, CO 80301 offer tags in a kilohertz frequency ranges. These tags have a maximum read distance limited to approximately one foot in clean conditions and are used for fish, animal and manufacturing process identification. A 915 Mhz ISM frequency system is extensively used in vehicle toll road collection and railroad car identification. Amtech Corporation, 17403 Preston Road, Dallas, TX 75252, is a major developer and supplier of tags, antennae and reader systems for this type application. Although the 915 Mhz has a more than adequate clean environment read range, minute films of drill mud or other drill rig contaminants restrict transmission of electromagnetic signals between reader and tags to the extent this frequency is not possible for this invention.

My invention anticipates the use of an ISM allocated RF frequency within the 125 Khz to 100 Mhz range, and more specifically, a preferred frequency of 27.1 Mhz. The tags of this frequency provide an adequate read distance for the requirements of this invention. A tag, reader and antenna in the 27,1 Mhz frequency range has been developed for another type application by Integrated Silicon Devices Pty. Ltd., 99 Frome Street, Adelaide, S.A. 5000, Australia. However, it is intended this invention not be limited only to the specific and preferred 27.1 Mhz frequency. dr

DESCRIPTION OF THE PREFERRED EMBODIMENTS

Figure 1:
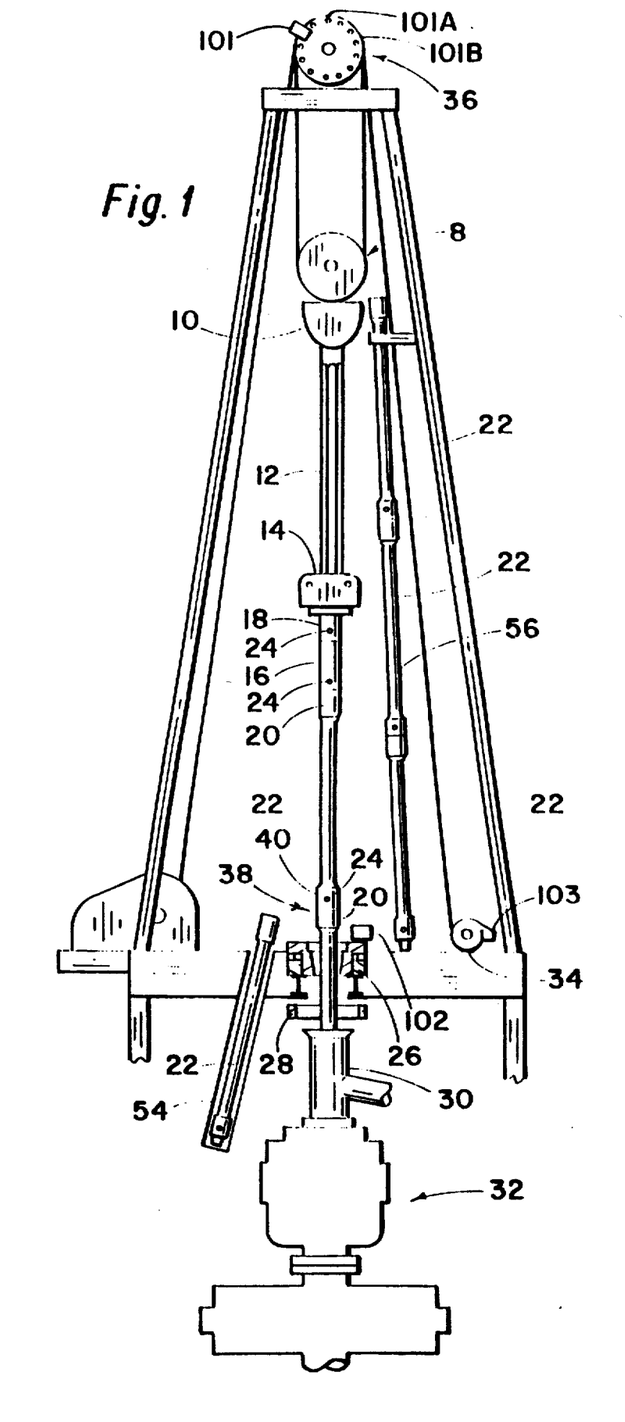
FIG. 1 shows schematically a drill rig derrick with the traveling block suspending the swivel, kelly and drill string.

Referring now to FIG. 1, traveling block 8, reeved with crown block 36 in the drill rig derrick, is shown suspending swivel 10. The swivel is screwed into hexagonal or square drive kelly joint 12 with kelly drive bushing 14 riding on the drive flat shoulder on the lower end of the kelly. The kelly saver sub 16 is screwed into the kelly joint pin 18 and, in turn, the saver sub pin is screwed into the tool joint box 20 of drill pipe joint 22. Uniquely coded electronic identification tags 24 are shown recessed in the pin end of drill string components 12, 16 and 22. The drill pipe extends through the rotary table 26, through the identification tag reader antenna 28 and into the well bore through bell nipple 30 mounted on top of the blowout preventer stack 32. Antenna 28 is preferably positioned just below the rotary table and its elevation is known. The illustrated position of the traveling block in the derrick with a single joint of drill pipe made up in the kelly saver sub is characteristic of having just made a connection of an additional pipe joint and prior to lowering the drill string to engage the kelly drive bushing in the rotary table to turn the drill string and recommence drilling.

Still referring to FIG. 1, interface sensor 101 may be supported from the frame beams of crown block 36 and measures rotation of fast line sheave 101B. Sensor signals are computer translated into traveling block vertical travel with consideration of the number of lines strung between the blocks having been manually keyed in the computer. Through knowledge of the sheave pitch diameter for the wire line passing over the fast line sheave, the footage of wire line used to either hoist or lower the traveling block 8 is computed with input from sensor 101 of sheave revolutions or fractions thereof. Fast line footage divided by the number of lines reeved between the blocks will equal the footage of travelling block travel. This sensor may include small magnets 101A positioned around fast line sheave 101B and magnetic switches actuated by the proximate passing of the magnets. Interface sensor 102 may also employ proximity switches for counting revolutions of the rotary table 26 and drill stem when drilling or reaming. Deadline anchor 34 commonly supported on the derrick floor employs a hydraulic load cell for measuring weight suspended by the traveling block and interface 103 uses a pressure transducer for transmitting this measurement to the computer. These interface units are commercially available from Oilfield Instruments, Inc., 17923 Fireside Drive, Spring, Texas, 77379.

Figure 2:
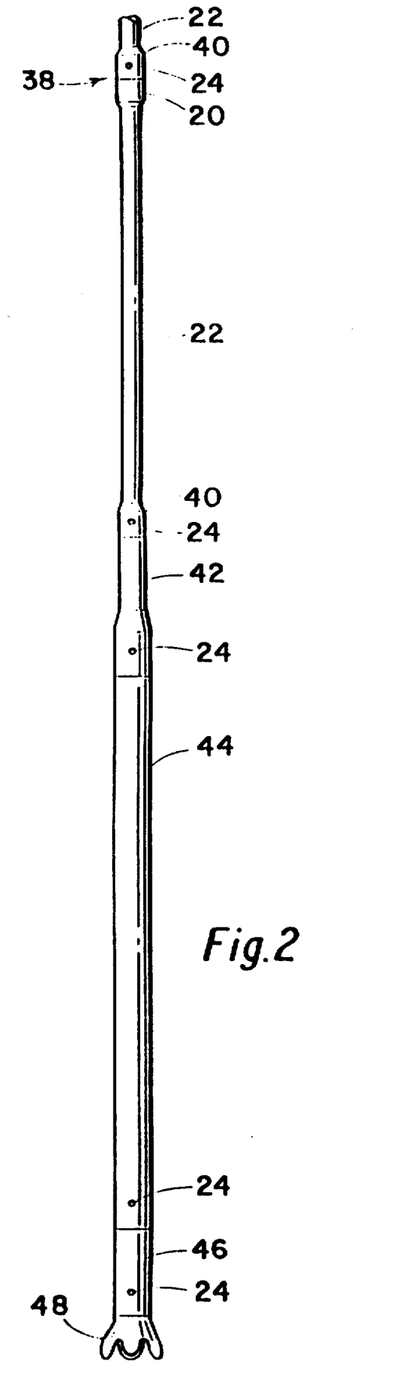
FIG. 2 shows a drill collar with subs and bit which constitute the components of a typical bottom hole assembly. Drill pipe then completes the drill string up the hole to the rig.

Referring now to FIG. 2, additional drill string components are shown as might typically be located at the bottom of the hole. Drill pipe 22 is connected to other pipe joints up the hole by tool joint 38 consisting of box 20 and pin 40. The drill pipe tool joint pin is made up in the box of crossover sub 42. The crossover sub pin in turn is screwed into the drill collar 44. Although but one drill collar is shown, there are ordinarily multiple collars in the hole. The drill collar is shown screwed into a bit sub 46 and the drill bit 48 is made up in the bit sub. The components 42, 44 and 46 are conventional and are referred to as the bottom hole assembly. Note that drill stem boxes are up and pin threads are on the lower end of a component. Few exceptions to this general rule occur and are primarily in bottom hole assemblies.

Figure 3:
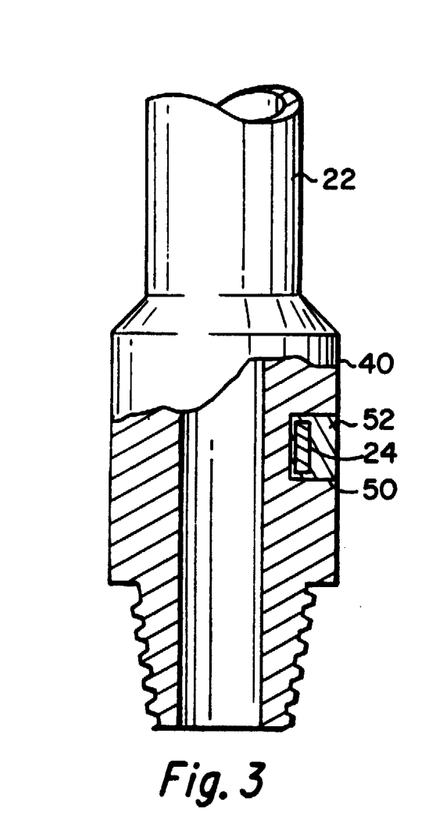
FIG. 3 is a partial section of the pin end of a drill pipe tool joint showing an identification tag in a recess and retained by a plug.

My novel well component identification tag assembly is shown in FIG. 3. A segment of a drill pipe tool joint has been cut away to illustrate the identification tag 24 in a protective recess 50 in the tool joint pin. These identification tags receive an electromagnetic signal from the reader antenna 28 by means of the tag's own internal antenna. The energy derived from the reader transmission is sufficient to enable the tag to re-transmit a uniquely coded binary signal back to the reader. The identification tag 24 is held and retained in place by a plastic type plug 52 which is conductive to electromagnetic signals. The plugs may be bound, pressed, threaded, cast and hardened in place or otherwise secured in the recess. The plugs serve the primary and key function of keeping formation clays, cuttings or drill fluids from accumulating over the tag antenna and attenuating the electromagnetic communication signals between the tag and reader. These plugs are installed flush with the outside diameter of the component in which a tag is mounted and provides a sacrificial wear surface remaining smooth with the outside diameter of the tool joint or component as it wears in the hole. An additional advantage of the plug is in buffering and protecting the tag from handling on the rig or from in-hole damage.

Figure 4:
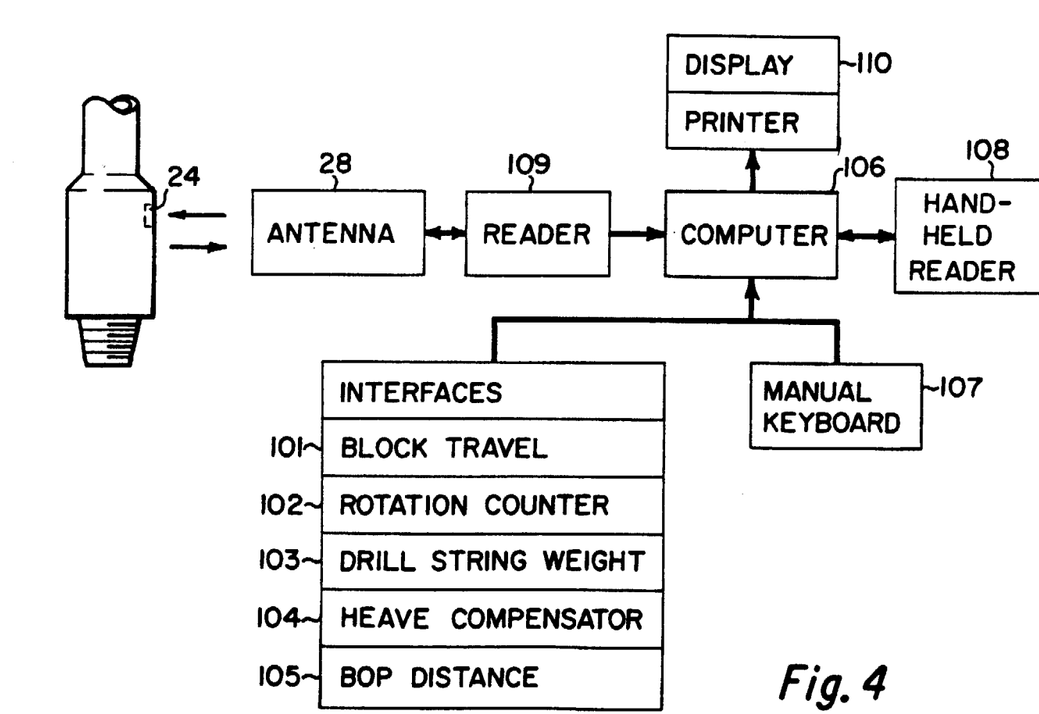
FIG. 4 shows a block flow diagram typical of the reader and computer system.

Referring now to FIG. 4, a block diagram of a typical information or data flow method of the system illustrates the reader 109 with antenna 28 transmitting an electromagnetic energizing signal to identification tag 24 and a coded identification response being returned to the reader by the tag. The antenna is connected to the reader by means of suitable wiring or cable and the reader may be remotely located or housed with the computer 106. Various developers and manufacturers of electronic identification tags and readers are available offering several different technological approaches to reader and tag transponder electronics. For instance, the identification tag may respond with a modulated excitation signal to provide the binary identification code or the tag might contain an oscillator energized by the reader excitation transmission enabling a coded response on a different electromagnetic frequency.

Still referring to FIG. 4, the interfaces from rig equipment are shown; sensor 101 providing the computer information regarding the direction and travel distance of the traveling block; a rotary table rotation sensor 102 for counting revolutions, or in the case of a top drive, a revolution counter sensor at the top drive mechanism; and weight indicator sensor 103 to provide information regarding the weight suspended from the traveling block. Interface sensors 104 and 105 are described later. The keyboard 107 permits manual entry into the computer 106 of drill string serial numbers and physical information to the data base related to identification tag coding; untagged component lengths and physical data which are to be included in a tally; datum elevation measurements from the reader antenna elevation; well bore inclination and direction survey readings with depth interval; selection of desired display or print-out; the number of lines reeved to the traveling block; the traveling block suspended weight, or load, setting which activates travel distance and direction into depth computations; and sub-sea blowout preventer seal elevations. The visual display 110 may be by means of a CRT or LCD screens.

As the drill string passes through the drill floor, reader 109 by means of antenna 28 transmits and receives electromagnetic signals to identify tagged components. Tag coding accesses the unique data base record to recall component length and features. This tally is maintained in a computer data element as an inventory by component type and tallied length and tally summations. Appropriate adjustments by the computer are made for block travel and correction from antenna to datum elevations. By means of visual display 110 to the driller, tallied and computed depth determination may be categorized similar to a common form as in the drillers hand kept records. Driller records are normally separated into feet of kelly in the hole, drill pipe joint quantity and total length and bottom hole assembly component quantity and total length. The total footage of these categories when drilling represent total well depth to the driller which will be retained by the computer for display when the string is hoisted off bottom. A like procedure is followed in the case of top drive substitution for the swivel and kelly except that feet of pipe of the last identified joint will be recorded into the hole rather than kelly footage.

An additional feature of the invention as shown in FIG. 4 is a battery powered hand held reader 108 with memory means capable of identifying components on the pipe rack or in remote locations. This inventory data may be communicated with the main computer. Identification remote from the drill floor is desirable for the grading, selection and sorting for improved service factor equalization among all components of a composite drill string. An umbilically attached reader is also a feature of the invention and may be substituted for a battery powered unit when the computer system is sufficiently nearby.

Figure 5:
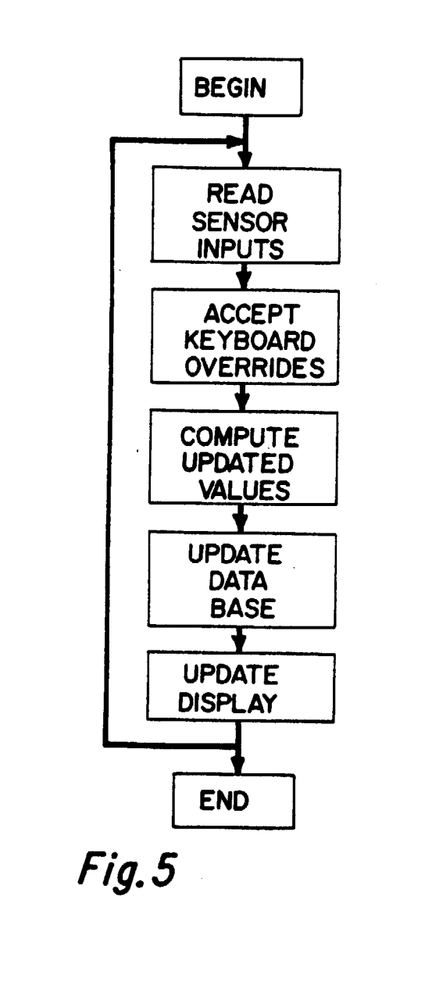
FIG. 5 shows a basic data acquisition and flow diagram for the computer system.

Referring now to FIG. 5, a basic data acquisition and flow diagram within the computer system shows data acquisition from reader and sensors contained in the Read block 112. The Accept Keyboard Overrides 114 is intended for keyboard input of various data as so described elsewhere in this description of the preferred embodiments. The Compute Update Values 116 provides tally totalization, service factor computation and other like calculations for the Update Data Base 118 segment of the flow diagram. Visual or printed results of such computations or keyboard override instructions is represented by the Update Display 120 block. Other off-line features include data reporting and portable hand reader inventory monitoring.

Referring again to FIG. 1, to illustrate an example in which bit depth and total depth may be determined by the system computer, consider the traveling block 8 supporting swivel 10 and kelly 12 has drilled down maximum kelly travel to the top of the kelly drive bushing 14 in the rotary table 26. Pipe and bottom hole assembly tally totalization is combined with kelly travel which is measured by means of block travel sensor 101 activated into depth computations by a sufficient suspended weight detected by means of sensor 103. When drilling new hole, these summations establish the current total depth for driller display. When the drill string is hoisted off bottom, as for the purpose of adding an additional pipe joint for drilling deeper, a negative block travel distance is activated into bit depth calculation. The block with swivel and kelly lifts the string to where the upper-most tool joint box 20 may be suspended in the rotary table by means of drill pipe slips. The connection between the kelly saver sub 16 and the pipe tool joint box is broken, the kelly lifted out of the box and lowered for make up into the box of the drill pipe joint located in the "mouse hole" 54. As block suspended weight with only the swivel, kelly and a single joint is not sufficient to trigger incorporation of block travel distance into tally calculations, the new connection is hoisted out of the mouse hole by the kelly with no change in bit depth and made up into the joint supported by slips in the rotary table. On picking up the entire string from the slips, drill string weight is adequate to cause block travel to be included in bit depth computation and the entire assembly appears as shown in FIG. 1.

As the string is then lowered, the newly added section with tool joint pin 40 containing identification tag 24 is recognized passing reader antenna 28. The reader provides a unique coding to the computer which recalls from the data bank the newly identified joint's length and incorporates it with the tally of in-hole components but does not yet include the new joint footage in the totals. Were the newly picked up joint to be added forthrightly, summation of the new joint length into total tallied footage will provide an erroneous and excessive bit depth as most of the new joint footage is in the derrick and not yet in the well bore below datum elevation. A datum elevation representing top of kelly drive bushing (KDB) or top of the rotary table is ordinarily used when drilling with a kelly. Assuming a KDB reference datum, the bit depth computation will provide a footage equaling the antenna to KDB measurement plus the previously tallied component totals of footage in the hole and plus lowering traveling block distance.

As lowering block travel adds to bit depth, the kelly saver sub is next identified. With new tag recognition, the newly picked up joint actual data base measured length is added in the tallied length totals as a replacement for the block travel measurement. Any error in block travel measurement may thereby be corrected. When the kelly pin 18 is identified with continued lowering of the traveling block the same process replaces measured travel with data base actual measurement of the saver sub. The footage of kelly in the hole is thereafter measured by means of block travel and totaled into bit depth until such time as the bit reaches the well bore bottom and the bit depth display thereafter equals the total depth display as drilling new hole recommences.

In the case of a top drive, the same general procedure is followed except that neither the kelly, the kelly drive bushing or mouse hole is used and an entire three joint stand 56 as shown in FIG. 1 is connected in the derrick by the top drive from the stand stood back position. With the kelly and kelly drive bushing not used, the conventional swivel is replaced by a motor driven swivel suspended by the traveling block. This powered swivel is known as a top drive. With no kelly drive bushing, reference datum elevation of top of rotary is desired. When the lower-most joint tag of a stand 56 is identified by the reader and processed in the computer in a like manner to that used with the kelly lowering a newly picked up single joint into the hole. However, the distance between the reader antenna and top of rotary is substituted for the KDB datum. This process is then repeated for the next two joints of the stand as deeper drilling progresses.

As the drill string is hoisted, or as a trip out of the hole is made and pipe withdrawn from the well, the tally is adjusted through block travel and reader identification of withdrawn components and bit depth is displayed. When tripping in the hole, the tally of pipe and bottom hole assembly provides the bit depth in a computation also utilizing the block travel and weight interface inputs. As in making connections either with a kelly or with a top drive, block travel is recorded into depth computation only when the weight indicator interface setting in the computer is exceeded.

A computer comparison of block travel distance to successive reader identified tag tallies will serve as a check against insertion in the string of untagged components not properly keyed in the tally record. This check may also reveal a possible tag malfunction so the faulty tag can be replaced and the identification code of the new tag re-identified with a stenciled serial on the component. When block travel does not match identified contiguous component tally combinations, an error will be noted in the tally record and an audible signal notifies the driller of the tally discrepancy.

When a tally display or print out by each individual section of drill stem either in the hole or as to be stood back in the derrick during a trip is desired, such display for the driller may be as subassemblies of three joints, or stands. On trips out of the hole, this is for such purposes as easy driller identification of the stage he is at on a trip; locating components to be changed out or relocated; changing thread breaks from the last trip to check for possible dry or leaking connections; and anticipating the method drill collar stands will be stood back in the derrick for handling convenience.

An additional feature of the invention is the capability to compute and record various service factors which serve as a measure of wear and useful service life of a drill string and its components. One such embodiment is the service parameter represented by the total footage drilled by each drill string component. Total cumulative footage drilled by individual component may be determined by the computer utilizing the tally of pipe in the hole and the recording of footage drilled during the interval each identified component is in well bore service.

Another embodiment of the invention is the measurement of a drill string service factor represented by the cumulative total count of revolutions imposed on each tagged component while drilling or reaming. This count is provided through an interface with a rotation sensor 102 of FIG. 1 mounted on the rotary table or top drive. The count will be activated from drill string rotation and recorded to each individual component present in the well bore.

An additional embodiment of the invention is a system for automatically determining and recording to a cumulative service data element an estimation of fatigue damage experienced by tagged and tracked drill pipe joints rotating through relatively sharp well bore curvatures. The curvatures, or dog legs, that may cause fatigue damage occur in "straight" or non-directional holes but are commonly present in directionally drilled holes. Dog leg curvatures are measured in terms of the change in degrees of angle per 100 feet of hole. This change is actually the change in overall angle produced by a change in inclination as well as a change in direction as from a compass heading. For the location of these curvatures, surveys are commonly taken at various depth intervals and in problem straight hole areas, as in directional drilling, may be run every thirty feet or less of hole drilled.

The system computer calculates overall changes in hole angle from keyboard entry of depth, hole inclination and direction in directional holes. Only the change of inclination is entered if straight hole is being drilled and directional information is not provided by the survey instrument. Dog leg severity is computed to provide degrees per 100 foot of overall angle change. This calculation is by means of solid geometry and trigonometry. Equations for calculation of dog leg severity have been derived by several sources, one of which was by Arthur Lubinski, then of Stanolind Oil and Gas Company, and presented in his paper entitled "Chart for Determination of Hole Curvature (Dog Leg Severity)". This paper was presented to the American Petroleum Institute Mid-Continent District Study Committee on Straight Hole Drilling on Oct. 31, 1956.

To ascertain dog leg reverse bending stresses which occur to cause component fatigue damage, the computer calculates the bending stress imposed by hole curvature. As shown in the following equations, bending stress calculations consider the "effective tension" occasioned by the weight of the drill string suspended below the curvature interval by the drill pipe in the dog leg and a buoyancy factor. The general equation for determination of bending stress may be stated as:

$$\sigma_b = \frac{cED}{2} \frac{KL}{\text{Tanh } KL}$$

In field units, this equation becomes:

$$\sigma_b = c\frac{\pi ED}{432000} \frac{KL}{\text{Tanh } KL}$$

in which:
$O_b$ = unit bending stress, psi
$c$ = hole curvature, degrees per 100 feet
$E$ = modulus of elasticity
$D$ = drill pipe OD, inches
$K =$ $$\sqrt{\frac{T_s}{EI}}$$

$T_s$ = "effective tension" in the drill string in$^4$
$L$ = half the distance between tool joints, inches The "effective tension", $T_s$, or more precisely the bending-coupled tension, is calculated from the computer tally of drill string components by means of an equation taking the form of:

$$T_s = T_{tb} - \Sigma M_a W_a K_b$$

in which
$T_{tb}$ = weight suspended by the traveling block, pounds
$M_a$ = tallied component lengths above the dog leg, feet
$W_a$ = weights in air of tallied components above the dog leg, pounds/foot $K_b$ = buoyancy factor with drill mud in the well bore $\quad = 1 - \frac{\text{density of drill mud}}{\text{density of components}}$ $\quad = 1 - \frac{W_g}{65.45}$ (for steel drill string and where $W_g$ = drill mud density in pounds/gallon)

The drill mud density may be manually keyed in the computer or an interface to the computer system may be employed with an automatic drill mud density sensor common to many drill rigs.

Fatigue data is usually developed in the laboratory by testing polished specimens subjected to fully reversed bending stresses with no axial tension. Such a fatigue curve typical of a Grade E drill pipe suggests the bending stress vs cycles to failure. ($\sigma$-N) curve in a non-corrosive environment shown in FIG. 8.

Figure 8:
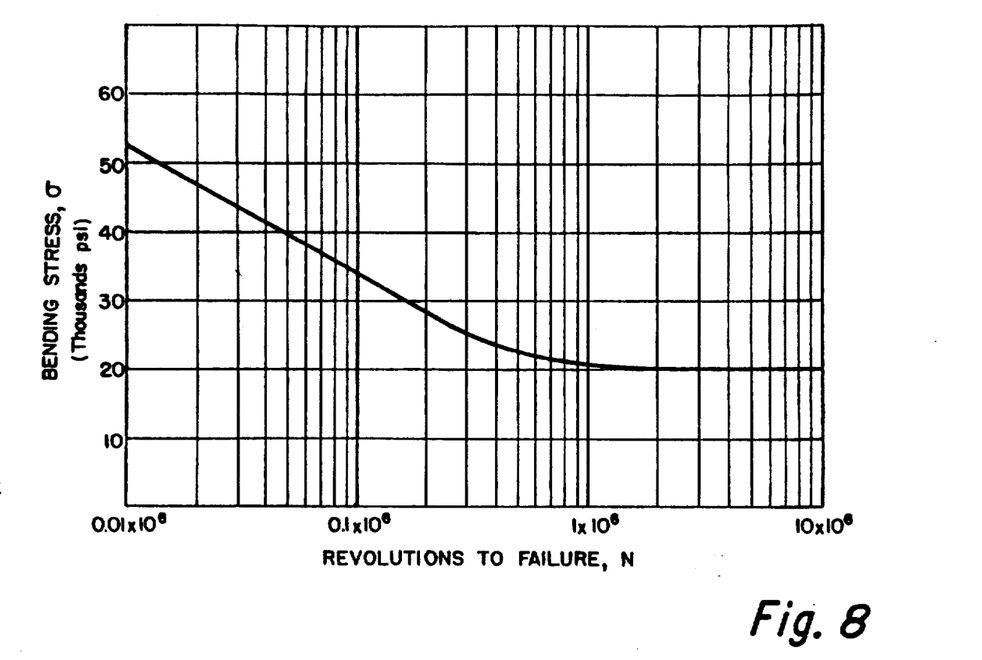
FIG. 8 shows a drill string fatigue curve, without axial tension.

In the presence of a corrosive environment, this curve may be replaced by a curve located below the non-corrosive environment curve. For an extremely corrosive environment such as many drill muds, it is suggested a factor of 0.6 be applied to the ordinate of the $\sigma$-N curve. The o-N curve to be next illustrated demonstrates the application of a 0.6 corrosion factor to the non-corrosive environment curve. This corrosion factor may be varied according to field experience with various drill muds.

Drill string weight below the dog leg is suspended by the joints in the dog leg to result in axial tension in the components undergoing bending stress in the dog leg. In the presence of this axial tension, the fatigue effect of bending becomes much more severe. The effect of axial tension may be represented by the same $\sigma$-N curve previously illustrated but with bending stress 0 being replaced by an effective bending stress. $\tau\sigma_b$, which accounts for axial tension. With this correction for tensile stress, the $\tau\sigma_b$-N curve becomes that shown in FIG. 9.

Figure 9:
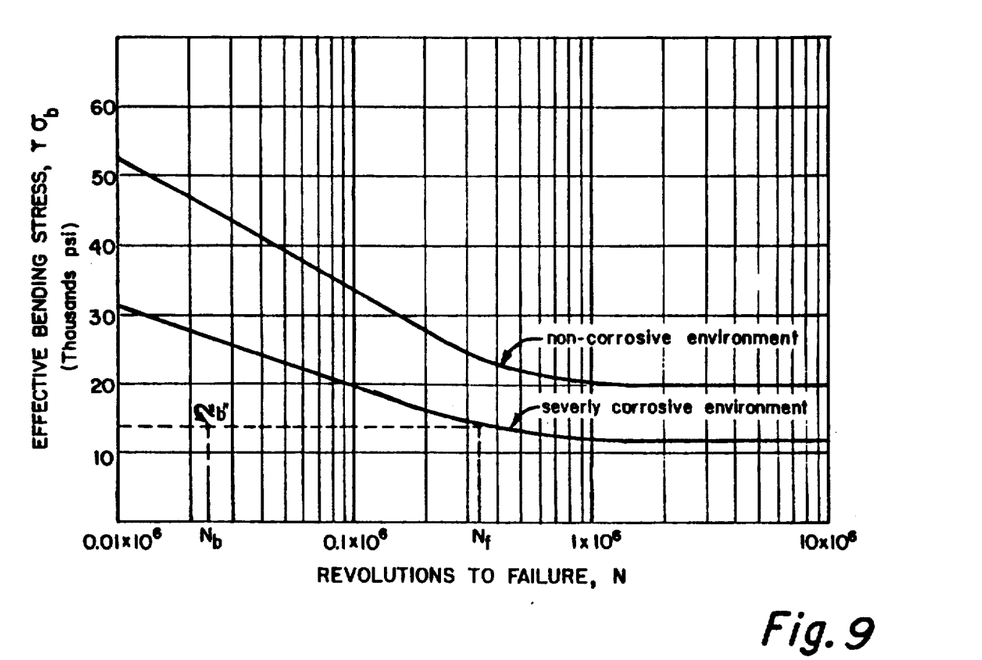
FIG. 9 shows a drill string fatigue curve, with axial tension.

The axial stress correction factor is obtained from the equation:

$$\tau = \frac{t}{t - \sigma_t}$$

in which:
t = ultimate tensile strength of the drill pipe, psi
$O_t$ = tensile stress, in psi, imposed on the drill pipe in the dog leg as calculated by:

$$\sigma_t = \frac{T_{tb} - \Sigma M_a W_a}{A}$$

in which:
$T_{tb}$ = weight suspended by the traveling block, pounds
$M_a$ = tallied component lengths above the dog leg, feet
$W_a$ = weight in air of tallied components above the dog leg, pounds/foot
A = cross sectional area of a component in the dog leg, in$^2$ For steel pipe having a density of 489.5 pounds/cu. ft., the equation for $\sigma_t$ may be expressed as:

$$\sigma_t = \frac{3.40}{W_{ac}} [T_{tb} - \Sigma M_a W_a]$$

in which:
$W_{ac}$ = weight in air of component in the dog leg, pounds/foot

The block suspended weight, $T_{tb}$, is the total buoyed string weight with the bit off bottom minus the amount of weight run on the drill bit. The tension on the dog leg components regardless of weight run on the bit then is the traveling block suspended weight minus the summation of footage weights in air times their lengths of the components above the dog leg. There is no essentially no projected component area upon which incremental hydrostatic head differentials buoy the drill string components extending to the surface and the buoyancy factor need not enter this equation.

The estimate of the fraction of fatigue life expended by a drill pipe joint rotated at a certain number of cycles and stress as to incur fatigue damage is computed according to Miner's Rule by means of appropriate $\tau\sigma_b$-N curves stored in the computer. This rule is illustrated in the above illustrated $\tau\sigma_b$-N curve by an example whereby point "b" represents fatigue damage for the number of rotations counted by the rotary interface at computed stress level "b" while traversing a particular hole curvature. The fraction of fatigue life, f, expended by a component reaching this point of fatigue damage is:

$$f = \frac{N_b}{N_f}$$

in which:
$N_b$ = number of cycles to point "b" at stress level "b"

$N_f$ = total number of cycles to failure at stress level "b"

According to Miner's Rule, these fractions of fatigue life expended are additive and the summations will provide a record of individual component cumulative fatigue damage recorded in a data element. Fatigue damage summations may be recalled from the data element as a percentage of fatigue life or as a fraction in which unity indicates imminent failure.

Bottom hole assembly drill collar fatigue estimates can also be mathematically computed through a procedure which requires additional input of information such as drilled hole sizes, whether and how drill collars are made concentric within the hole curvature with stabilizers, the amount of weight run on the bit with respect to buoyed bottom hole assembly weight and whether the dog leg angle is increasing or decreasing.

Figure 6:
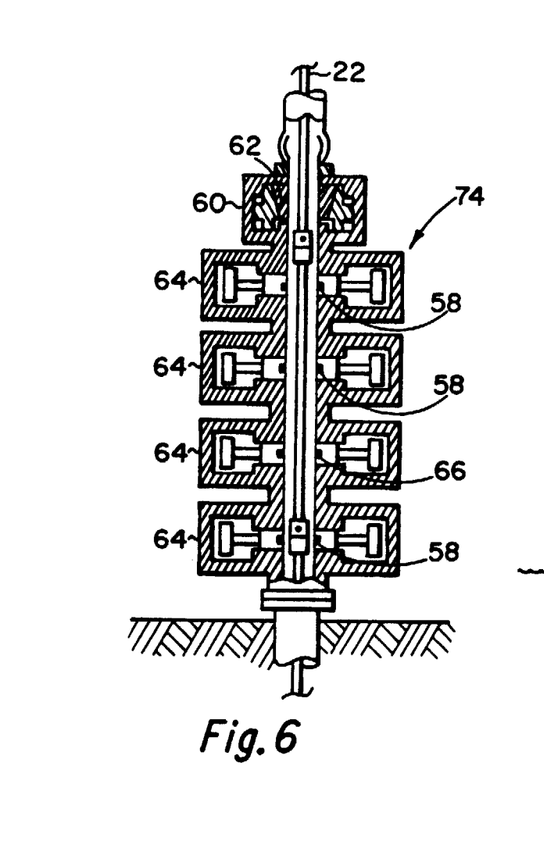
FIG. 6 schematically illustrates a sub-sea blowout preventer stack on the sea floor below a floating drill vessel which has drifted off the hole center.
Figure 7:
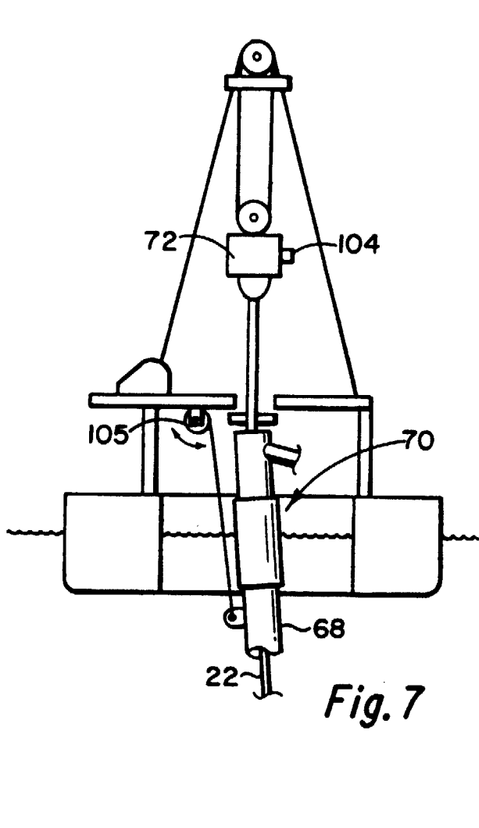
FIG. 7 shows a drill rig in which measurements are made to correct locations of tallied and tracked components.

Referring now to FIG. 6, an additional embodiment of the invention is the ability to continuously monitor the exact location of tool joints, subs, valves or other shapes and diameters with respect to seal locations and elevations within sub-sea blowout preventer (BOP) stack 74. Sub-sea ram type BOP's are for the common purpose of closing around drill pipe in order to contain abnormal formation pressures. Ram type preventers 64 are outfitted with a pair of heavy steel rams containing a half circle with an elastomer type ram pack-off seal 58. When the ram pairs come together they completely encircle and seal around the drill pipe body. Due to the close tolerances necessary to encircle the pipe body and support the ram seal element under pressure, rams are unable to close properly around diameters different than what they were intended. Therefore is is essential that pipe ram closure around tool joints or off-size diameters be avoided and that the driller knows the position of tool joints or other unsealable objects within the BOP stack. Complete shut-off or blind rams 66 do not contain a pipe configuration and are designed to act as a valve if no pipe is in the hole. An annular type preventer 60 employs a large donut shaped elastomer seal element 62 forced into the well bore by an hydraulically activated cone arrangement. This type preventer is usually of a lesser pressure capability but is able to close around almost any shaped object. Annular preventer seal elements wear rapidly should a tool joint or off-size diameter repeatedly pass up and down through the element as caused by drill vessel heave in rough seas and therefor closure should also be maintained around the drill pipe body.

A distance measurement from the rig floor datum elevation is used to compare the location of tallied and tracked component and physical characteristics relative to pack-off or seal area elevations within the blowout preventer stack. Corrections to measurements from rig floor datum elevations to BOP seal areas are made for tides, vessel draft, vessel drift off hole center and vessel heave. These corrections are made by means of measuring distance variations from the drill floor elevation to the top marine riser section 68 just below the riser slip joint 70. As the top section of the marine riser represents a fixed length measurement to the sub-sea BOP stack, interface sensor 105 provides the measurement correction for tides, vessel draft, vessel movement off the well bore and sub-sea blowout preventer stack 74. This correction is made by means of a small diameter wire line connected to the top marine riser section which is spooled on an constant tension air hoist drum. As the vessel distance from the sub-sea stack varies, the constant tension air hoist drum either pays out or takes up the wire line. Line travel distance may be measured by sensor 105 using proximity switches in an similar manner to crown block fast line sensor 101. This correction is summed with block travel as compensated for vessel heave by piston travel of hydraulic cylinder type heave compensator 72 containing interface sensor 104. Interface sensors 104 and 105 are available from Oilfield Instruments, Inc., 17923 Fireside Drive, Spring, Texas, 77379.

A mathematical correction is also made by the computer for drill string stretch due to the drill string weight. In deep water this stretch is significant in the pipe section between the drill floor datum and the BOP stack elevation. This stretch or elongation computation is based upon pipe tension as determined by the weight suspended from the blocks, the distance to the sub-sea stack which has been established and entered in the computer and the automatic component tally with physical data, cross sectional areas, modulus of elasticity, Poissons Ratio and manually keyed drill fluid weight. Should the mud system have an automatic mud weight measurement device installed, sensor means can be substituted for manual drill fluid weight input. An equation for this elongation in general form is:

$$\Delta z = \frac{T_{tb}}{AE} L - \frac{\delta_s - 2\nu\delta_m}{2E} L^2$$

in which:
$\Delta z$ = total elongation
$T_{tb}$ = weight suspended by the traveling block
$A$ = cross sectional area
$L$ = distance between rig floor datum and sub-sea BOP stack
$E$ = modulus of elasticity
$\delta_s$ = density of steel
$\delta_m$ = density of drill mud
$\nu$ = Poissons Ratio In field units and with $\delta_s$=489.5 lbs/cu. ft., E=30,000,000 and $\nu$=0.28, this equation may be expressed as:

$$e = \frac{T_{tb}L}{735444 W_{dp}} - \frac{L^2}{9.626 \times 10^7} [65.45 - 0.56 W_g]$$

in which:
e = total elongation, inches
L = feet
$T_{tb}$ = pounds
$W_{dp}$ = drill pipe weight, lbs/ft
$W_g$ = drill mud weight, lbs/gal Audible or visual alarms at preventer operating stations will provide warning against improper closure and a means of graphic display of the stack depicting component passage will be displayed to the driller.

While the above descriptions contain many specifics, they should not be construed as limitations on the scope of the invention, but rather as an exemplification of the preferred embodiments and applications thereof.

What is claimed is:

1. An identifying apparatus for use in drilling operations utilizing a drill bit and drill string comprising:
   said drill string having a wall with a recess therein, opening to the exterior thereof;
   an electronic identification tag;
   an electromagnetically conductive material secured within and substantially filling said recess for holding said tag in place within said recess.

2. An apparatus as defined in claim 1 in which the tag has a frequency of about 27.1 megahertz.

3. An apparatus as defined in claim 1 in which said electromagnetically conductive material is a plastic material.

4. A device as defined in claim 1 in which said electromagnetically conductive material's exterior surface is flush with exterior of said wall.

5. An apparatus for minimizing electronic identification tag communication signal attenuation including:
   an electronic identification tag in a drill string component protective recess;
   an electromagnetically conductive type material securing said tag in said recess, said material having an external surface flush with the component outside surface and having wearing characteristics similar as that of the material of said component.

6. An apparatus for determining well drilling parameters in the drilling of bore holes in the earth using drill string components comprising:
   a uniquely coded electronic tag carried by each of selected individual drill string components which are moved up and down with respect to a bore hole, said tag positioned in a recess in the wall of said component and held in place by an electromagnetically conductive material substantially filling said recess and providing a sacrificial wear surface remaining smooth with the outside of the drill string component as it wears in the hole;
   a reader located at a known elevation adjacent said drill string component and capable of detecting he presence of each said tag and transmitting an output signal identifying said detected tag;
   a computer capable of receiving the output signal from said reader for each signal detected for each tag.

7. An apparatus as defined in claim 6 including means to detect the rotation of a said drill string component and record same for each component in said well bore during such rotation.

8. An apparatus as defined in claim 6 including means to detect the suspended weight of said drill string components in the welland record same.

9. An apparatus as defined in claim 6 including sensor means to sense the vertical movement of a drill string component and record same.

10. A system for drilling of offshore wells in water from a floating vessel of locating off-size portions of drill pipe tool joints or other drill string components having diameters with respect to a reference datum for which sub-sea blowout preventer seal and pack-off elements at the sea floor located at a certain elevations are not suitable to close around for proper seal and pressure containment comprising:
    (a) uniquely coded electronic tags recessed in individual drill string components,
    (b) a reader system for detecting each said individual tagged component as it passes through the rig floor,
    (c) computer means to provide a tally and tracking of said detected components within the well and sub-sea blowout preventer bore,
    (d) keyboard input into said computer means of information concerning said sub-sea blowout preventer seal and pack-off elevations with respect to a datum,
    (e) interface means for correcting any variances in said elevation of said pack-off and seal elevations from said datum elevation,
    (f) means for detecting the amount of drill string stretch between the derrick floor datum and said sub sea blowout preventer stack,
    (g) means to enter said drill string stretch amount into said computer for determining the true elevation of said off-size portions at any time, and
    (h) display means showing elevation position of said off-size portions with respect to the position of each said drill string component as it passes through said sub-sea blowout preventer stack.

11. An apparatus for measuring an providing drill string service life factors utilizing automatic drill string identification and tracking of components in the well bore by means of a system comprised of:
    (a) uniquely coded electronic identification tag positioned in a recess in each individual drill string components and held in place by an electromagnetically conductive material filling said recess and providing a sacrificial wear surface remaining smooth with the outside of the drill string as it wears,
    (b) reading means for detecting and identifying each tag as each said tagged component pass through the rig floor,
    (c) computer means connected to said reader means to provide a tally of said individual components in the well bore, and including means to record the footage drilled during the interval each said tallied component is engaged in drilling hole to obtain total cumulative footage drilled for each component,
    (d) means to provide rotation count for each component during the interval each said tallied component is engaged in drilling to record total cumulative rotations for each such component, and
    (e) display and print-out means of the data recorded.

12. An apparatus as defined in claim 1 for ascertaining drill pipe fatigue damage resulting from rotating in a well bore dog leg causing tension-coupled bending stresses $\sigma_b$ in which $$\sigma_b = \frac{cED}{2} \frac{KL}{\text{Tanh } KL}, \text{ in which } K = \sqrt{\frac{T_s}{EI}}$$

and $T_s = T_{tb} - \Sigma M_a W_a K_b$ in which
c = hole curvature, degrees per 100 feet
E = modulus of elasticity
D = drill pipe OD, inches
$T_s$ = "effective tension" in the drill string at the dog leg, pounds
I = moment of inertia of the drill pipe, in$^4$
L = half the distance between tool joints, inches
and which comprises:
    (a) means for combining the axial tension with said tension-coupled bending stress $\sigma_b$ to provide effective bending stress $T\sigma_b$ where $$\tau = \frac{t}{t - \sigma_t}, \text{ in which } \sigma_t = \frac{T_{tb} - \Sigma M_a W_a}{A},$$

in which
t = ultimate tensile strength of the drill pipe, psi
$\sigma_t$ = tensile stress, in psi, imposed on the drill pipe in the dog leg
$T_{tb}$ = weight suspended by the traveling block, pounds
$M_a$ = tallied component lengths above the dog leg, feet
$W_a$ = weights in air of tallied components above the dog leg, pounds/foot
A = cross sectional area of a components in the dog leg, in$^2$
    (b) means for obtaining "c", $T_{tb}$, $K_b$, nd data bank recall of component physical data for the computer solutions to the above equations,
    (c) means to combine the rotation cycle count of claim 14 of said drill pipe in said dog leg with the effective bending stress to obtain fatigue damage amount, and
    (d) means to determine the fraction of fatigue life expended by said fatigue damage as represented by the ratio of the number of cycles at said effective bending stress level to the total number of cycles to failure at said effective bending stress level as obtained in a fatique curve for said component rotating in said dog leg.

13. An apparatus for providing a tally of drill string components supported by a traveling block in the well bore below a rig floor by means of an automatic tracking system comprising:
    (a) uniquely coded electronic identification tag recessed in each individual drill string components,
    (b) a reader system to read said tagged components as each pass through the rig floor,
    (c) computer means connected to said reader system to provide a tally of said identified drill string components,
    (d) means to sense the movement of said block and the load carried thereby and to record same in said computer means,
    (e) display and printout means of said tally.

14. An apparatus as defined in claim 13 including means to tally the cumulative rotation count of each drill string component.

* * * * *